United States Patent
Jakubiak

(10) Patent No.: US 7,620,939 B2
(45) Date of Patent: Nov. 17, 2009

(54) AUTOMATIC CONFIGURATION OF REGRESSION TEST CONTROLS

(75) Inventor: Nathan Michael Jakubiak, Pasadena, CA (US)

(73) Assignee: Parasoft Corporation, Monrovia, CA (US)

( * ) Notice: Subject to any disclaimer, the term of this patent is extended or adjusted under 35 U.S.C. 154(b) by 709 days.

(21) Appl. No.: 11/365,303

(22) Filed: Feb. 28, 2006

(65) Prior Publication Data

US 2006/0225048 A1  Oct. 5, 2006

Related U.S. Application Data

(60) Provisional application No. 60/668,228, filed on Apr. 4, 2005.

(51) Int. Cl.
*G06F 9/44* (2006.01)
(52) U.S. Cl. .................... 717/124; 715/234; 717/125
(58) Field of Classification Search ........ 717/100–178; 714/37, 38; 702/123, 186
See application file for complete search history.

(56) References Cited

U.S. PATENT DOCUMENTS

| | | | | |
|---|---|---|---|---|
| 5,673,387 | A * | 9/1997 | Chen et al. ................ | 714/38 |
| 6,061,643 | A * | 5/2000 | Walker et al. ............. | 702/123 |
| 6,490,696 | B1 * | 12/2002 | Wood et al. ............... | 714/38 |
| 2002/0066077 | A1 * | 5/2002 | Leung ....................... | 717/126 |
| 2003/0120464 | A1 * | 6/2003 | Taft et al. ................. | 702/186 |
| 2004/0103396 | A1 * | 5/2004 | Nehab ....................... | 717/127 |

OTHER PUBLICATIONS

"XML Path Language (XPath)" by. James Clark and Steve DeRose, Nov. 16, 1999, W3C, Version 1.0, pp. 1-37.*

* cited by examiner

*Primary Examiner*—Lewis A Bullock, Jr.
*Assistant Examiner*—Carina Yun
(74) *Attorney, Agent, or Firm*—Christie, Parker & Hale, LLP

(57) ABSTRACT

A method and system for regression testing of a computer software. The method and system execute the software for a first time to create a first data set; execute the software for a second time after the first time to create a second data set; compare the two data sets to determine differences between the two data sets; and store the differences as allowable differences to be ignored in a subsequent regression testing of the software.

19 Claims, 3 Drawing Sheets

AUTOMATIC CONFIGURATION OF REGRESSION TEST CONTROLS

CROSS-REFERENCE TO RELATED APPLICATION

This patent application claims the benefit of the filing date of U.S. Provisional Patent Application Ser. No. 60/668,228, filed on Apr. 4, 2005 and entitled "Automatic Configuration of Regression Controls to Ignore Unimportant Differences," the entire content of which is hereby expressly incorporated by reference.

FIELD OF THE INVENTION

The present invention relates generally to computer software testing; and more particularly to a system and method for regression testing of computer software.

BACKGROUND OF THE INVENTION

Regression testing is a way of testing software where the test verifies that the functionality of the software that worked previously continues to work. One form that regression testing takes is for the software to be executed and output collected from the software. The output is saved as the regression control. At a later point (often repeated at regular intervals), the software is executed again and further output collected. This second output is then compared to the regression control. If the comparison reveals differences between the second output and the regression control, then a regression has been found. Subsequently, the tester has to manually determine whether that difference was due to an acceptable change in the software or whether an error was introduced.

Complexities arise, however, when the output has elements within it that change in an acceptable manner. For example, the software might include its version number and release date within the output. Whenever a new version of the software is released, this information is expected to change within the output. In this scenario, the regression control may be updated to contain the new version and release date information when the new version is released, so that the regression test does not fail. If a new version of the software is not released very often, this method may work well to keep the regression test working properly.

In another example, the software might include within the output data, the date and time at which the output was generated. This is an example where a portion of the output (date and time) is expected to always be different. The method used to update the regression control in the previous example will not work in this case, because the regression control is out of date as soon as it is created due to the fact that the output changes every time the software is executed.

In these kinds of cases, one of two things can happen. Either a regression test will not be created using this output, or the date and time will be somehow manually marked as a portion of the control that is allowed to be different when the comparison is made. Currently the process of marking the difference as allowable is a manual process, whereby a human operator will look at the differences found, determine which ones are allowable, and then somehow modify the comparison process so that the differences are not determined to be errors when the regression test is run. This process can become a lot of work for the operator, if there are many differences that need to be marked in this way within a single regression test or across other similar regression tests that the operator may be using.

Therefore, there is a need for a more efficient and effective approach to conduct regression testing and generate regression test controls.

SUMMARY OF THE INVENTION

In one embodiment, the present invention is a method and system for regression testing of a software. The method and system execute the software for a first time to create a first data set; execute the software for a second time after the first time to create a second data set; compare the two data sets to determine differences between the two data sets; and store the differences as allowable differences to be ignored in a subsequent regression testing of the software.

In one embodiment, the present invention is a method and system for regression testing of a software. The method and system store allowable differences between a first execution of the software and a second execution of the software; regression test the software; compare the results of the regression testing to the stored allowable differences; and ignore the portion of the results that match the allowable differences.

In one embodiment, the present invention is a method and system for regression testing of a software. The method and system execute the software to create an output; determine allowable changes in the output due to dynamic portions of the output that are expected to change over time; regression test the software; compare the results of the regression testing to the allowable changes; and ignore the portion of the results that match the allowable changes.

DETAILED DESCRIPTION

In one embodiment, the present invention is a method and system for automatically determining how to report only important differences in the process of regression testing of computer software. Regression controls are used in regression testing to control the process. A regression control is a saved set of data that can be used against which to verify a second set of data that will be obtained some time in the future. The saved data set is compared to the new data set to validate that the new set of data has not changed. This is used in software testing to validate that once a section of code is verified as working, it continues to work in the future.

In one embodiment, when creating regression tests, the present invention automatically sets up the tests to ignore the insignificant or allowable differences between different executions of the software, so that the tests do not report them as errors. Data that specifies what differences should be considered insignificant is stored along with the regression control. When testing, the regression tests perform the normal comparison between a new data set and the regression control, compare the differences found with the ignored differences, and only report those differences that were not ignored.

In one embodiment, the present invention is a method for automatically configuring a regression control used in regression testing of data expected to be dynamic. The configuration results in the behavior that some differences between the control and the data being tested are considered allowable and are not reported as differences. In one embodiment, the present invention is a method for automatically determining the invariants in the regression control.

In one embodiment, the present invention is a method for automatically determining the set of insignificant differences that are used along with the regression control.

This includes the following steps:

Execute the system to be tested, create and store a baseline data set (the regression control).

Execute the system a second time after the first execution, and create a second data set Compare the two data sets, noting any differences between them.

Save the differences as insignificant (allowable) differences along with the baseline data set to be ignored when running regression tests on the system in the future.

The logic here is that differences found between two executions of the system in succession are unimportant, assuming that the software being tested was not modified or that modifications did not change the contents of the output.

Figure 1:
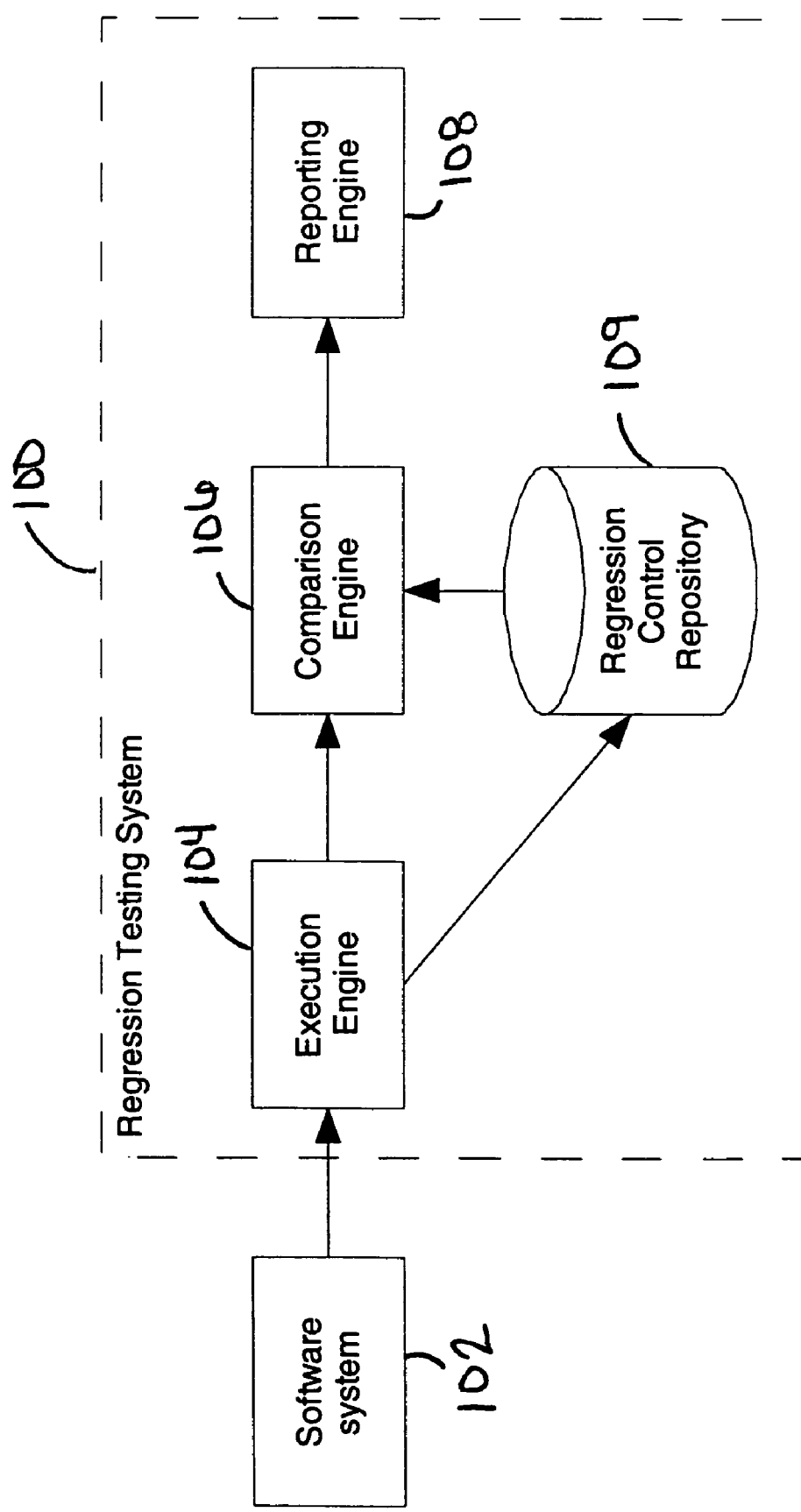
FIG. 1 is an exemplary functional block diagram of a regression testing system, according to one embodiment of the present invention.

FIG. 1 is an exemplary functional block diagram of a regression testing system, according to one embodiment of the present invention. The regression testing system 100 includes an execution engine 104, a comparison engine 106, a reporting engine 108 and a regression control repository 109 (memory). In the setup phase, the execution engine 104 executes the software system 102 (or some portion of it, for example, a method) to be tested, and stores the output that was received from that execution as a regression control in the regression control repository 109.

In the testing phase, the execution engine 104 executes the same method in the software system 102, however this time, it passes the output from the execution engine 104 to the comparison engine 106. The comparison engine 106 then retrieves the regression control pertaining to the method in the software system 102 being tested, and compares the current output with the regression control. If the comparison finds unexpected differences between the current output and the regression control, then those differences are reported by the reporting engine 108.

Figure 2:
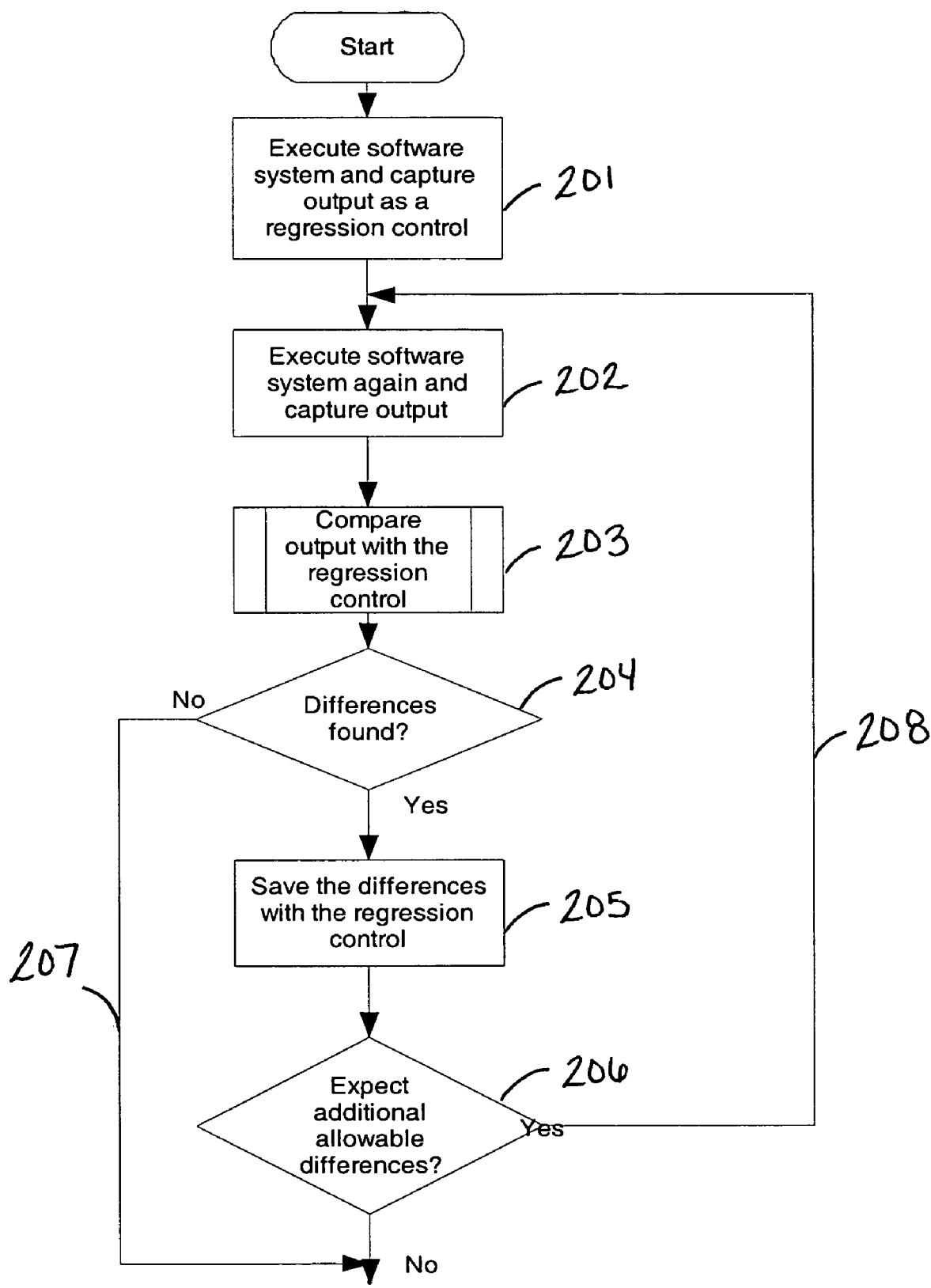
FIG. 2 is an exemplary flow diagram of a method for automatically configuring the set of allowable differences to be used along with a regression control, according to one embodiment of the present invention.

FIG. 2 is an exemplary flow diagram of a method for automatically configuring the set of allowable differences to be used along with a regression control, according to one embodiment of the present invention. This pertains to the setup phase of the regression test. First, the execution engine 104 executes the software system 102 being tested, and captures output returned by the execution of the software system. The execution may execute the entire system, or may only execute some subset of the system. This output is then stored as a regression control within the regression control repository 109, as shown in block 201. At some later point the execution engine again executes the same subset of the software system and captures its output, in block 202. The time at which this next execution is done may vary. For example, it may be done immediately after the first execution, it may be done a day later, or it may be done some unspecified length of time in the future.

The comparison engine 106 then compares the output of the second execution with the regression control that was already stored within the regression control repository, in block 203. In block 204, if the output from the second execution matches the regression control, then no allowable differences need to be configured for the regression control and the method terminates, as shown by process path 207. If the output and the control do not match, however, then the differences that are found are added to the regression control as allowable differences, in block 205.

The differences may be stored in different ways. For example, the actual content that is different may be stored in text output including the line number(s) on which the differences occurred. Similarly, in XML output, an XPath that determines the location of the difference may be stored. The number of different ways that differences may be stored is not limited to these examples and may vary according to user preferences. In each case, some information that identifies what is allowed to be different is what gets stored along with the regression control. The assumption here is that the software system has not changed between the first execution and subsequent executions of the system that are setting up the allowable differences. The logic is that any differences that can be found in the output are due to dynamic portions of the output that are expected to change, and are not due to errors that have been introduced into the software. In block 206, as long as further differences in the output can be expected due to its content being dependent on when the test is run (for example, when the current day of the week is included in the output), the process may be repeated through the process path 208. When repeating the process, in block 203 the comparison engine may take into account allowable differences that have already been configured for the regression control and ignore those differences. Once all repetitions are complete, the process then terminates.

Figure 3:
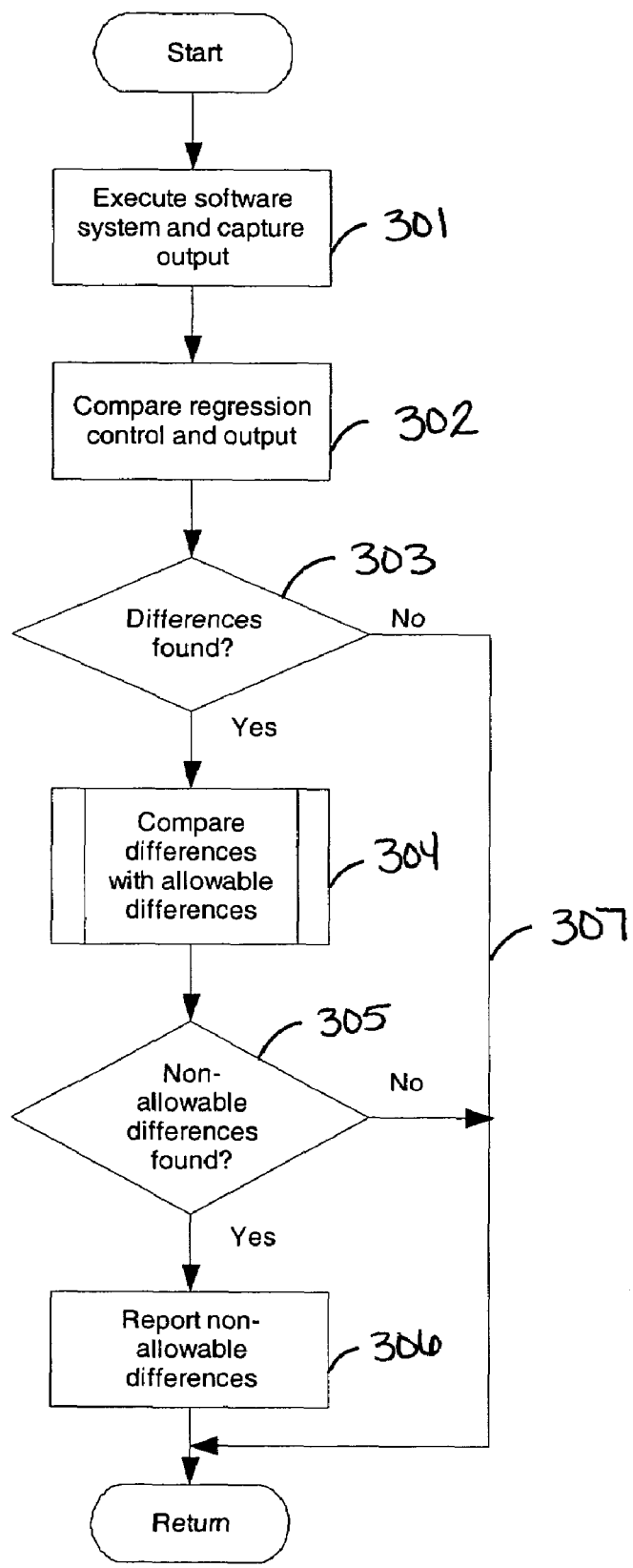
FIG. 3 is an exemplary process flow diagram for a method of regression testing using allowable differences, according to one embodiment of the present invention.

FIG. 3 is an exemplary process flow diagram for a method of regression testing using allowable differences to not report expected differences, according to one embodiment of the present invention. This process flow describes how the allowable differences may be used. First, the execution engine 104 executes the software system 102 (or some subset of the system) and captures its output, in block 301. In block 302, the comparison engine 106 then compares the output with the regression control that has already been saved in the regression control repository 109 that corresponds to the part of the system being executed. In block 303, if no differences are found by the comparison engine, the test has found no errors and the process terminates through path 307. If differences are found, then each difference is compared against each of the allowable differences saved for the regression control, in block 304. If a difference matches (block 305) one of the allowable differences in block 304, that difference is discarded. The matching method could take a number of forms. For example, a difference could match an allowable difference if both differences appear at the same location in the output. All differences that are not deemed allowable in this manner are then reported as regression errors by the reporting engine 108, in block 306.

As an example, in Web application testing, one way for a tester to determine that a web application continues functioning as expected is to store the HTML of the application's web pages. Typically, scheduled tests then revisit the same pages, and compare the HTML of those pages with what was stored. However, in web applications, there are many differences that show up between two subsequent visits of the same pages. These differences could be insignificant differences such as, a date or time shown in the page, session id information contained in links or form fields, or other random or generated data specific to the current iteration of the page. These kinds of differences are expected, therefore, the tester does not want them to be reported.

In one embodiment, the present invention visits a set of HTML pages, and stores the HTML as a regression control for each page separately. The invention then immediately revisits the same set of HTML pages and collects the HTML for each page. For each page, the invention then compares the HTML and saves the differences as unimportant along with the baseline HTML for that page. Later tests then only report differences in the HTML that were not stored, for each page.

The software system being executed in this case is the web application server and all of its components and content. The output being validated is the HTML of the various web pages that are visited by the testing system. The HTML of the various pages is what gets stored as the regression controls in the regression control repository. The differences that get stored along with the regression controls are the line numbers where the content differed, along with the portions of the HTML that are different. This information is what is used later, during the testing phase, in determining which differences need to be reported as errors.

In another example for Web Service testing, one way for a tester to validate that a web service continues working as expected is to make a request to the web service and store the result (response). This result can be used later to compare the results of another invocation of the web service with the same data. The XML returned from a web service can have the same types of unimportant differences between two different executions as HTML in a web application.

In one embodiment, the present invention utilizes the following process to automatically set up the regression control to ignore these insignificant differences:

Make a request to a web service and store the XML response as the regression control.

Make the same request to the same web service a second time.

Compare the responses from the two requests, noting what is different.

Create XPaths (an industry standard for representing specific data within an XML document) that represent the differences in the XML responses.

Store the XPaths along with the regression control. In future tests, only report differences that do not appear in the same location(s) as those specified by the XPaths.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for regression testing of a software, the method comprising:

executing the software for a first time to create a first regression control data set;

substantially immediately after the first run, executing the same unmodified software for a second time after the first time to create a second regression control data set;

comparing the two regression control data sets to determine differences between the two regression control data sets;

storing the differences between the first regression control data set and the second regression control data set, in at least one of the regression control data sets, as allowable control differences to be ignored in a subsequent regression testing of the software;

re-executing the same software for regression testing;

comparing results of the regression testing with the stored allowable control differences; and reporting results that arc not included in the stored allowable control differences.

2. The method of claim 1, wherein only a portion of the software is executed for the first time and the same portion of the software is executed for the second time.

3. The method of claim 1, wherein the software is a web application.

4. The method of claim 1, wherein the software is a web service, the first data set is a first XML response and the second data set is a second XML response of the web service.

5. The method of claim 4, wherein the comparing the two data sets to determine differences comprises comparing the two data sets to create XPaths that represent differences in the first and second XML responses.

6. The method of claim 1, wherein the storing the differences comprises storing a text output including the line numbers on which the differences occurred.

7. A method for regression testing of a software, the method comprising:

executing the software for a first time to create a first regression control data set;

storing allowable regression control differences between the first execution of the software and a second execution substantially immediately after the first execution of the same unmodified software, in the regression control data set;

regression testing the same software;

comparing results of the regression testing to the stored allowable regression control differences; and ignoring the portions of the results of the regression testing that match the allowable regression control differences and reporting results that are not included in the stored allowable control differences.

8. The method of claim 7, wherein the software is a web service, the first execution output is a first XML response and the second execution output is a second XML response of the web service.

9. The method of claim 8, wherein the comparing the results of the regression testing comprises comparing the two data sets to create XPaths that represent differences in the first and second XML responses.

10. The method of claim 7, wherein the ignoring the portion of the results that match the allowable differences comprises determining if the results of the regression testing appear at the same location as the stored allowable differences; and ignoring the portion of the results that appear at the same location.

11. A method for regression testing of a software, the method comprising:

executing portions of the software to create a regression control data set; determining allowable changes in the regression control data set due to dynamic portions of the regression control data set that are expected to change over time;

storing the determined allowable changes, in the regression control data set to be ignored in a subsequent regression testing of the software;

regression testing the same unmodified portions of the software;

comparing results of the regression testing to the allowable changes; and ignoring the portions of the results that match the allowable changes and reporting results that do not match the allowable changes.

12. The method of claim 11, wherein the software is a web application.

13. The method of claim 11, wherein the software is a web service, the output is a first XML response and the results of the regression testing is a second XML response of the web service.

14. The method of claim 13, wherein the comparing the results of the regression testing comprises comparing the two data sets to create XPaths that represent differences in the first and second XML responses.

15. The method of claim 11, wherein the ignoring the portion of the results that match the allowable differences comprises determining if the results of the regression testing appear at the same location as the allowable differences; and ignoring the portion of the results that appear at the same location.

16. A system for regression testing of a software comprising:
   an execution engine for executing the software for a first time to create a first regression control data set and executing the same unmodified software for a second time substantially immediately after the first time to create a second regression control data set;
   a comparison engine for comparing the two regression control data sets to determine differences between the two regression control data sets;
   a memory for storing the differences of the two regression control data sets in at least one of the regression control data sets, as allowable control differences, wherein the execution engine re-executes the same software for regression testing, and the comparison engine compares results of the regression testing with the stored allowable control differences; and
   a reporting engine for ignoring the allowable differences in a subsequent regression testing of the software and reporting results that are not included in the stored allowable control differences.

17. The system of claim 16, wherein the software is a web service, the first data set is a first XML response and the second data set is a second XML response of the web service.

18. The method of claim 17, wherein the comparison engine creates XPaths that represent differences in the first and second XML responses.

19. The method of claim 16, wherein the memory stores a text output including the line numbers on which the differences occurred.

* * * * *

UNITED STATES PATENT AND TRADEMARK OFFICE
CERTIFICATE OF CORRECTION

PATENT NO. : 7,620,939 B2 Page 1 of 1
APPLICATION NO. : 11/365303
DATED : November 17, 2009
INVENTOR(S) : Nathan Michael Jakubiak It is certified that error appears in the above-identified patent and that said Letters Patent is hereby corrected as shown below:

Column 6, line 4, Claim 1        Delete "arc",
                                 Insert --are--

Column 7, line 5, Claim 13       Delete "testing is",
                                 Insert --testing are--

Signed and Sealed this

Sixth Day of April, 2010

David J. Kappos
*Director of the United States Patent and Trademark Office*